United States Patent
Skiba et al.

(10) Patent No.: US 10,003,692 B2
(45) Date of Patent: Jun. 19, 2018

(54) SYSTEM INITIATED DIALOG ADJUSTMENT

(71) Applicant: AVAYA INC, Santa Clara, CA (US)

(72) Inventors: David Skiba, Golden, CO (US); Reinhard Klemm, Basking Ridge, NJ (US); Patrick Tendick, Basking Ridge, NJ (US); George W. Erhart, Loveland, CO (US); Wen-Hua Ju, Monmouth Junction, NJ (US)

(73) Assignee: Avaya Inc., Santa Clara, CA (US)

( * ) Notice: Subject to any disclaimer, the term of this patent is extended or adjusted under 35 U.S.C. 154(b) by 0 days. days.

(21) Appl. No.: 15/298,914

(22) Filed: Oct. 20, 2016

(65) Prior Publication Data
US 2018/0115643 A1    Apr. 26, 2018

(51) Int. Cl.
*H04M 3/00* (2006.01)
*H04M 5/00* (2006.01)
*H04M 3/51* (2006.01)
*H04L 12/58* (2006.01)

(52) U.S. Cl.
CPC .......... *H04M 3/5191* (2013.01); *H04L 51/02* (2013.01); *H04M 3/5175* (2013.01); *H04M 2203/2061* (2013.01)

(58) Field of Classification Search
CPC .. H04M 3/5191; H04M 51/02; H04M 3/5175; H04M 2203/2061
USPC ............................... 379/265.09, 266.01, 309
See application file for complete search history.

(56) References Cited

U.S. PATENT DOCUMENTS

| | | | |
|---|---|---|---|
| 8,369,496 B2 | 2/2013 | Deshpande et al. | |
| 8,855,292 B1 | 10/2014 | Brunson | |
| 8,873,739 B2 | 10/2014 | Hemm et al. | |
| 8,953,772 B2 | 2/2015 | Wilson | |
| 9,002,843 B2 | 4/2015 | Itoh et al. | |
| 9,020,135 B2 | 4/2015 | Skiba et al. | |
| 9,124,697 B2 | 9/2015 | Scott et al. | |
| 2005/0111653 A1* | 5/2005 | Joyce .................... | H04M 3/523 379/265.09 |

(Continued)

OTHER PUBLICATIONS

"Avaya close to make intelligent 'Slate' chatbot to transform customer service," ETTelecom, 2016, retrieved from http://telecom.economictimes.indiatimes.com/news/avaya-close-to-make-intelligent-slate-chatbot-to-transform-customer-service/52958805#.V3LHt_ZEde4.mailto, 3 pages.

(Continued)

*Primary Examiner* — Quynh Nguyen
(74) *Attorney, Agent, or Firm* — Sheridan Ross P.C.

(57) ABSTRACT

Text-based automated customer service agents provide an attractive contact center interaction for may customer-agent communications. However, the "say anything" nature of text may result in additional problems not encountered in prompted interactions. A single misunderstanding or error may cause an automated communication to fail, however, by providing micro-tasks to a human agent, an automated communication may be maintained longer with benefit of a human agent's input. A lack of progress towards completion of a work item may cause the communication to be routed to a human agent and/or a different channel (e.g., voice, email, etc.). Accordingly, a micro-task or an opt-out operation may be provided to maintain the communication with an automated agent for as long as possible but yet provide improved customer service when necessary.

18 Claims, 9 Drawing Sheets

(56) References Cited

U.S. PATENT DOCUMENTS

| | | |
|---|---|---|
| 2005/0141694 A1 | 6/2005 | Wengrovitz |
| 2010/0235218 A1 | 9/2010 | Erhart et al. |
| 2010/0296417 A1 | 11/2010 | Steiner |
| 2011/0125793 A1 | 5/2011 | Erhart et al. |
| 2011/0125826 A1 | 5/2011 | Erhart et al. |
| 2011/0255683 A1 | 10/2011 | Flockhart et al. |
| 2012/0008754 A1* | 1/2012 | Mukherjee ............ G10L 15/22 379/88.18 |
| 2016/0099892 A1* | 4/2016 | Palakovich ............ H04L 51/04 709/206 |
| 2017/0054848 A1* | 2/2017 | Meng ............ G06Q 30/02 |

OTHER PUBLICATIONS

U.S. Appl. No. 15/285,091, filed Oct. 4, 2016, Skiba et al.
U.S. Appl. No. 15/285,160, filed Oct. 4, 2016, Skiba et al.

* cited by examiner

SYSTEM INITIATED DIALOG ADJUSTMENT

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for communications systems and particularly to communications comprising, in whole or in part, automated communicating entities.

BACKGROUND

Voice-based automated systems, such as an interactive voice response (IVR) and dual tone multi-frequency (DTMF) are common means to automate routing and call processing in contact centers. A previously defined option tree provides choreographed options at "branches" of the tree. Getting to a particular leaf node on a tree requires the correct branching decisions be made when presented. Branching options may include alternative options such as "Press the star key at any time to be connected to an agent." By providing limited options (e.g., pressing one of the keys on a touch-tone phone, providing a response to an explicit question, etc.), contact centers are able to route customers to appropriate resources and address most issues presented.

Customers today are demanding non-traditional and more convenient methods to contact a company. Channels, such as social media, web chat, and messaging applications are a few of the more popular non-traditional applications in use today. Both mobile and web (Internet) based technology companies are experiencing dramatic jumps in monthly active users (MAU). While non-traditional channels may be convenient for customers, the companies that have to implement and manage the extra systems, agents, and processes struggle to effectively handle new interaction types on the additional channel types.

Customer care delivered over chat, text, social media, and messaging is growing based in large part on demand for customer convenience and ease of communication. Cost efficient automated systems have become increasingly popular as the automated systems are available almost all of the time. However, this can be a problem for customers when the automated system/robot (or, more simply, "bot") does not understand their needs, does not know or have a selection for their needs, or becomes a frustrating wall to access an agent who could help them.

As the demand for service utilizing non-traditional channels (e.g., social media, text messages, etc.) increases, so too does the need for automation and self-service options for the channels. Automation and/or bot type applications can deliver self-service over text-based channels.

When automation and bot-type applications fail or are not meeting customer needs, an agent connection is typically required to address the customer problem quickly and efficiently. One of the biggest problems with automation is determining when to bring an agent into the conversation so that the right balance of automation versus agent utilization is achieved.

SUMMARY

These and other needs are addressed by the various embodiments and configurations of the present invention. The present invention can provide a number of advantages depending on the particular configuration. These and other advantages will be apparent from the disclosure of the invention(s) contained herein.

Navigating a decision tree is a common prior-art means to obtain information from customers utilizing an IVR, DTMF, or other phone-based communication device. Providing a response to an explicit question presented allows customers to navigate the decision tree and satisfy their need for calling. However, text-based communications (e.g., social media, text chat, instant messaging (IM), short message service (SMS), email, etc.) allows for freeform responses and, as a result, prior art decision trees are unable to handle messages from customers that may be in an undetermined/yet to be determined language, utilize shorthand or idioms, be or become off-topic, unexpectedly change topics, etc. Additionally, customer messages may be unresponsive/uncooperative as an intent, such as answering, "I hate this," when asked to provide an account number. Customers may also be unintendedly unresponsive/uncooperative, such as providing an account number when prompted to provide a transaction number, entering fewer digits than anticipated, etc.

Systems may have a default action to route all responses to a human agent when the response cannot be processed, however, such a paradigm is inefficient and causes a heavy, and expensive, reliance on human agents; agents that may be presently assigned to other tasks and causes the customer to wait until a suitable agent becomes available.

In one embodiment, system and methods are provided for a system-initiated dialog adjustment to detect situations where call progress is hindered and/or has stopped, such as when frustration has set in, there is a lack of cooperation from a customer, etc.

In another embodiment, a system monitors all aspects of the interaction, which may include, language analysis for content analysis (e.g., language, sentiment, intent, etc.), and dialog analysis for progress and compatibility with dialog automation. Methods of dialog progress may include entity collection and information density analysis.

The system then executes models to detect when an out-of-bounds condition has occurred or is about to occur. This may include conditions, such as, off-topic users. For example, when the conversation is not in the domain, or subject of the business, such as when a customer is not asking/talking about anything to do with airline topics (bags, reservations, late flights, airports, etc.). Uncooperative users, such as when the customer is not answering questions or is unresponsive to attempts at gathering information, may also be out-of-bounds conditions.

When the system detects these incompatible conversations, an alternate path is triggered and executed. This alternate path has the capability to perform actions including, but are not limited to:

Triggering an escalation workflow to acknowledge trouble and resolving with an alternate channel or a live agent;

Disconnection, with no effort to communicate or solve a problem when the appropriate response is to disconnect;

Logging of uncooperative person; and

Warning dialog where the customer is given a last chance to cooperate with the system or justification for why the information/dialog is needed.

In another embodiment, systems and methods are provided to trigger human intervention for micro-tasks to keep customers engaged in an automation-communications, such as when a small automation failure takes place.

Automation is a key strategy to reasonably managing interactions. However, the non-traditional channels often lack structure, resulting in "say anything" interactions. The "say anything" interactions allow a customer to say or ask anything, in any language, at any time. The additional channels can make staffing, interpretation, and channel management challenging and expensive. Desiring to keep costs and staffing at reasonable levels, companies desire an ability to maintain automation for all channels as often as reasonably possible.

In one embodiment, human intervention is provided for failed micro-tasks in order to keep customers in automation when a small automation failure takes place, as opposed to sending the entire dialog to a live agent to complete. As a benefit, interactions that would otherwise be rerouted to live agents would be kept in automation longer. Often an item that causes an interaction to be removed from automation is a simple, small item that can be addressed by simple human observation and/or intervention. In addition, micro-tasks often occur infrequently in a session and pausing the automated interaction so that an agent can intervene, while the remainder of the transaction can be handled by automation, helps maintain efficient utilization of resources.

In one embodiment, a process is disclosed, comprising one or more of steps:

1. A pre-routing module receives all requests from automation processes when automation fails.

2. The process obtains information about transaction history, and the current state that caused the failure in automation.

3. The process also obtains information about potential for further automation.

4. If there is no potential for further automation, the contact is passed to traditional agent routing.

5. If there is potential for further automation, the contact is passed to micro-task management with the collected information.

6. Micro-task management searches for a human to handle the micro-task that caused the automation to fail.

7. These tasks are ones that were difficult for the machine, due to models, environment, or non-standard language.

8. The human evaluates the micro-task and returns a quick response.

9. The system then attempts to put the interaction back into automation with the results of the human answer.

10. The customer resumes through the automation process either repeating if they get stuck again, completing self-service, or fully transfers to an agent for finishing service.

As a benefit, only the items that are difficult for a machine to process are routed to a live agent as micro-tasks, which include but are not limited to: language identification, intent, classification, non-native speaker, attempts to type ahead or anticipate answers, etc. In addition, the feedback from these micro-task resolutions may help influence future application changes.

For example, a user, Jeremy, sends a message to CJet airlines (a fictitious airline) over Facebook Messenger with a flight cancellation problem. Jeremy uses many numbers, airport codes, incomplete words. "GRR→ORD cancel 730 do 1020."

This text presents challenges to prior art machine-based systems which are not be able to process the messaging, including accurately interpret using language identification.

However, as disclosed herein, a human agent looking at the sentence can readily identify the language that Jeremy needs for a response.

The request is then passed to a micro-task agent, Tom. Tom can determine the message is in English and sets English as the appropriate language for an automated response. When the request is returned to automation, the customer is routed to the canceled flight automation bot for continued service in English. In the module, the directed dialog can be completed with the user without additional input or participation from Tom. The result is successful automated task completion that used very little of Tom's time.

In another embodiment, a mid-automation save is provided, such as where intent is easy to identify for a human but may not be part of the automation system. For example, a user, Amy, attempts to use Facebook Messenger to make an inquiry about a travel problem, such as, "Can you help me find my gifts?" An automation/bot processing the interaction is unable to discover the intent with this request. However, a micro-task agent can easily see that the intent is to inquire about a lost bag. The micro-task agent enters the intent of lost luggage back to the system, and sets the interaction to continue in automation. The automation responds with "Sorry about your luggage problems. Please enter your bag tag information." Amy then enters "cj560987623."

The automation/bot returns, "Your luggage is on the next flight from Washington. It will arrive at 8:04 PM." In this case, the micro-task agent saved an automation transaction from going to a live agent. In addition, the interaction can be sent to the self-learning automation as feedback for model improvements.

In another embodiment, system and method are provided that are operable to provide an appropriate opt-out feature capable of identifying intent and/or need to opt-out and executing an opt-out method. In a further embodiment, intent is identified and/or a need to opt-out of automation and, in response thereto, executes an opt-out method.

In another embodiment, an indication that a user (e.g., customer of a contact center) wants to opt-out of a current automated interaction. In a multi-modal communication, this may not always be more difficult to detect that a verbal request for "agent" during a speech-based communication The detection of the intent is variously embodied and include, but are not limited to, one or more of: an explicit request for opt-out through "agent" and "help" and "representative" type attempts; language analysis of intent through text language, text attributes, and text indicators of level of frustration; and/or dialog analysis through monitoring progress, lack of cooperation, too many iterations, dissimilar conversation (not on topic), and other signs of frustration/lack of cooperation in the dialog.

Once the user intent is identified as an opt-out participant, the system can dynamically determine in a second part, more specifically, the best action for opt-out. This may include several options determined by the current state and context of the conversation including, but not limited to: modality for opt-out, should they be sent for further text interactions, social media, messaging, or upgraded to a voice/video conversation. (i.e. premium customers with a frustration opt-out may get voice treatment); execution of an opt-out question for clarification. In some cases, a final question may be asked of the user before; transfer to an agent (e.g., "I am sending you to an agent, before I do, please tell me your frequent flyer number.").

After completing an opt-out action, the system can transfer the interaction to an agent, expert, or into a queue with all the relevant information about the user, the interaction, and the conditions causing the opt-out action.

In one embodiment, a system is disclosed, comprising: a network connection; a processor to: access a communication between a customer of a contact center and an automated agent of the contact center and wherein the communication is associated with a work item of the contact center, and wherein the communication comprises a plurality of messages utilizing a text communication channel; and upon determining from at least one of the plurality of messages the communication is not progressing towards resolution of the work item, initiating an alternative communication comprising at least one of an alternative agent or an alternative communication channel.

In another embodiment, a system, comprising: a network connection; a processor to: access a first communication between a customer of a contact center and an automated agent of the contact center and wherein the first communication is associated with a work item of the contact center, and wherein the first communication comprises a plurality of messages utilizing a text communication channel; receiving a response message, of the plurality of messages, from the customer; and in response to determining the response message comprises a nonsensical response, initiating a branch communication comprising presenting at least one of the plurality of messages to a human agent, receiving a response from the human agent, and processing the response from the human agent as the response message.

Other embodiments are also disclosed, including: a system, comprising: a network connection; a processor to: access a first communication between a customer of a contact center and an automated agent of the contact center and wherein the first communication is associated with a work item of the contact center, and wherein the automated communication comprises a plurality of messages utilizing a text communication channel; receiving a response message, of the plurality of messages, from the customer; and in response to determining the response message comprises an intent to opt-out of the first communication and initiate a subsequent interaction, selecting an opt-out mode, transferring the work item to a second communication between the customer a second agent, and terminating the first communication.

The system, wherein the intent to opt-out comprises an explicit request to discontinue the first communication.

The system, wherein the intent to opt-out comprises a statement of dissatisfaction with communication.

The system, wherein the intent to opt-out comprises a change in sentiment to the negative as the communication progresses.

The system, wherein the intent to opt-out comprises an increase in detected frustration as the communication progresses.

The system, wherein the intent to opt-out comprises at least one of a lack of cooperation, a topic of conversation unrelated to the work item, a text symbol indicating dissatisfaction, multiple statements comprising substantially the same content, or upon reaching a number of messages beyond a previously determined threshold without completing the work item.

The system, wherein selecting an opt-out mode comprises making a determination of whether the customer is dissatisfied with the channel of the first communication and, in response thereto, selecting the second communication comprising a second channel different from the channel of the first communication.

The system, wherein the second communication continues with the automated agent.

The system, wherein selecting an opt-out mode comprises making a determination of whether the customer is dissatisfied with the automated agent and, in response thereto, selecting the second communication comprising a human agent.

The system, wherein the second communication comprises a channel that is the same as a first channel utilized in the first communication.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(1) and/or Section 112, Paragraph 6. Accordingly, a claim incorporating the term "means" shall cover all structures; materials; or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form, and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
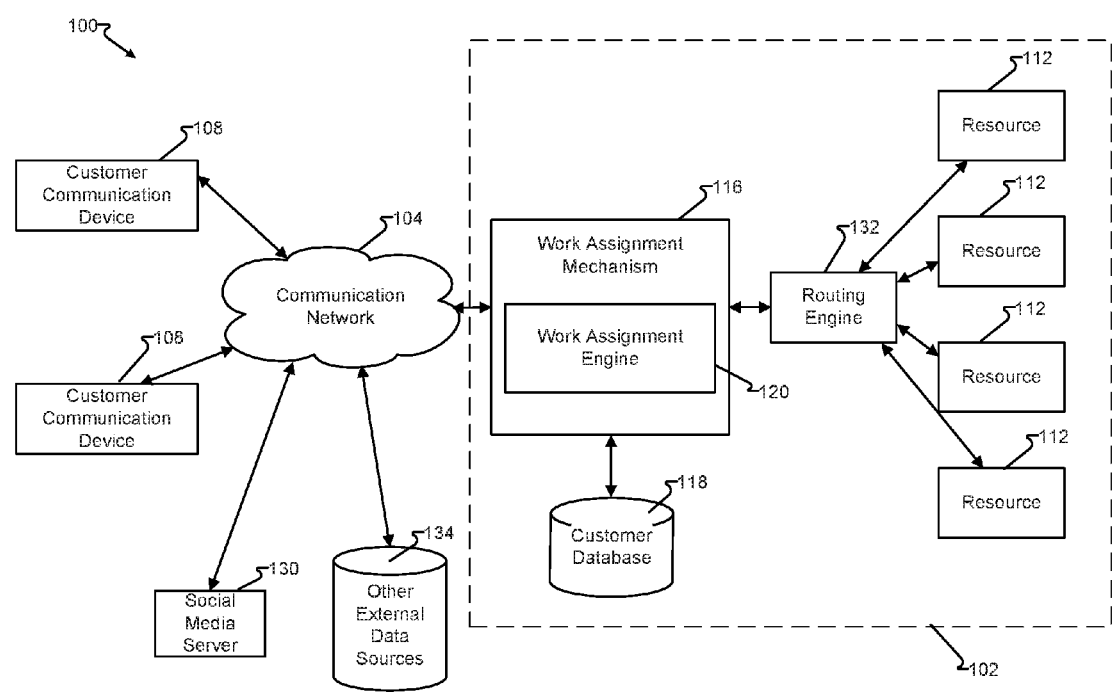
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media website 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
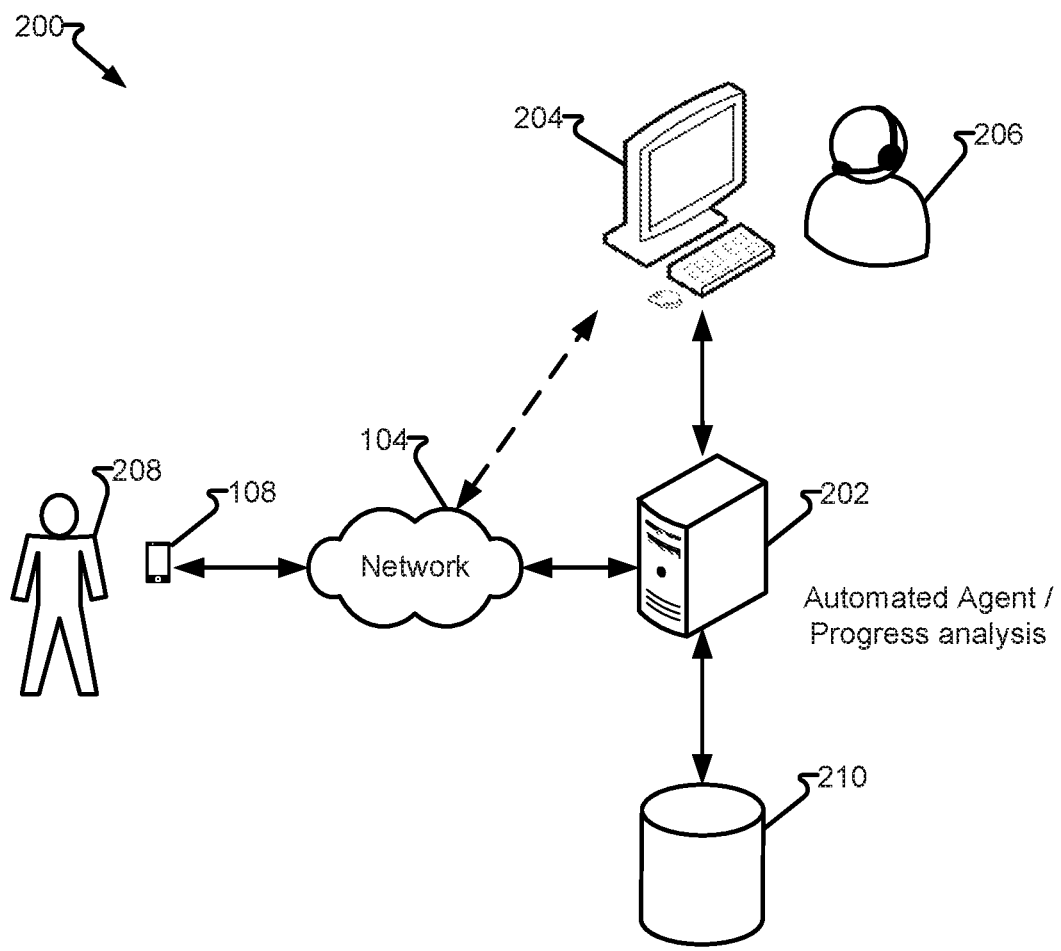
FIG. 2 depicts a second system in accordance with embodiments of the present disclosure.

FIG. 2 depicts system 200 in accordance with embodiments of the present disclosure. In one embodiment, customer 208, utilizing customer communication device 108, is engaged in a communication with an automated agent executed by server 202. The communication comprises network 104 and utilizes a text channel (e.g., email, IM, SMS, chat, social media posts/replies, etc.). In another embodiment, customer communication device 108, network 104, server 202, and optionally human agent 206 utilizing agent communication device 204 may be able to communicate utilizing another communication channel (e.g., voice/audio, video, etc.). In addition, or alternative to internal memory, database 210 may provide accessible storage to server 202 and/or customer communication device 204. Database 210 may be embodied as a networked device accessible via network 104 and/or other network. It should be appreciated that server 202 and/or database 210 may be a combined device, a plurality of devices, shared devices performing dedicated or distributed processes (e.g., "cloud" computing/storage, software as a service, etc.), or other configuration of components without departing from the disclosure provided herein. Database 210 may be utilized to store transaction information, responses, rules, programs, and/or other components. Server 202 may utilize network 104 and/or other network (e.g., Intranet, etc.) to send commands, receive information, and/or interact with other components. For example, customer 208 may interact with server 202 and an automated agent executed thereon to order an item from an online retailer. Server 202 may interact with other components to validate the customer's address and payment information, send shipping details to a warehouse, notify an inventory system, and/or other operations utilized to facilitate the transaction.

In an ideal state, communications between customer 208 and the automated agent progress without the need for intervention by a human, such as human agent 206, through to completion of the work item. Customer 208 provides information/actions requested by the automated agent and/or the automated agent provides information/actions requested by customer 208. However, text-based communications are less structured and may comprise any content at any time. For example, a voice-based system may prompt a customer for actions (e.g., "Press 1 for balance inquiry, Press 2 to hear your last deposits," etc.). Should a customer start entering an account number, the call may be misrouted, routed to an agent, or loop back to the same prompt, commonly with a "Sorry" message.

A text-based communication that forces a customer to stick to a highly scripted set of prompts may be unusable or, at best, frustratingly ridged. For example, an initial text message received by a contact center and server 202 may be: "Acc#1234567, balance?" Forcing a customer to navigate through a text-based prompt system results in inefficiencies as systems and persons must wait for, receive, and process responses to prompts, even if the information has already been provided by the customer. The resulting inefficiencies may cause customer dissatisfaction and the utilization of communications and processing resources to address the additional messages that are required to receive the required information when, and only when, asked. For example, if in response to a first text message ("Acc#1234567, balance?") the response was: "Thank you for contacting XYZ Bank. How may I help you?" or "Please provide your account number." The customer would likely become frustrated and additional messages would have to be transmitted so that the system could process the response to a paired query. Or, alternatively, the customer may abandon the text interaction, such as to reinitiate the communication with a higher-resource requirement channel, such as a voice based communication channel.

However, the improvements provided herein allow for a "say anything" approach to text-based communications which may appear more human and reduce the number of messages by accepting customer messages, and whatever content they contain, for processing. For example, "[XYZ Bank] Your account balance is $432.10. Would you like to hear your pending transactions?" And a customer may respond with, "Did check 555 clear?" The embodiments provided herein, enable an automated agent to determine what the customer is requesting and respond accordingly, and without requiring strict adherence to a set of scripted prompts.

As humans may "say anything," often systems are unable to determine what a response comprises or if a response is actually responsive or not. Even with advances in automated agents, a human may need to address certain issues or provide context to a particular message. Accordingly, a communication may incorporate the inputs of human agent 206 without including human agent 206 in the communication with customer 208 and once the context is provided, human agent 206 is reassigned to other tasks without waiting for a reply from either customer 208 or the automated agent. For example, a short text message may not comprise enough information for an automated agent to determine the language, such as "512 @?" may present a dilemma for an automated agent however, human agent 206 may be prompted to respond to a specific question from the automated agent, such as "what language?," "What task?," or even a broader, "What is the request?" Human agent 206 may respond to the automated agent with the specific information (e.g., "English," "Departure gate inquiry," etc.) or to rephrase the task to the automated agent (e.g., "What gate is flight 512 departing from?"). The automated agent may then utilize the response from agent 206, process the response, and respond to customer 208 while agent 206 has moved on to another task.

As used herein, a "work item" comprises a task associated with a purpose of contact center 102, which may utilize or incorporate one or more of human agent 206, agent communication device 204, server 202, database 210 and/or other or different components, including but not limited to the components of contact center 102 (see FIG. 1). A work item comprises a purpose, such as obtaining/providing information, marketing, offering or making sales of goods and/or services and/or adjustments, enhancements, or alterations thereto, etc. Examples of work items are variously embodied and include, but are not limited to, providing a customer with an account balance, rebooking a seat for a customer that missed a flight, taking an order for an article of clothing, updating a customer's account records, surveying the customer, customer service/satisfaction, problem solving, etc.

Figure 3:
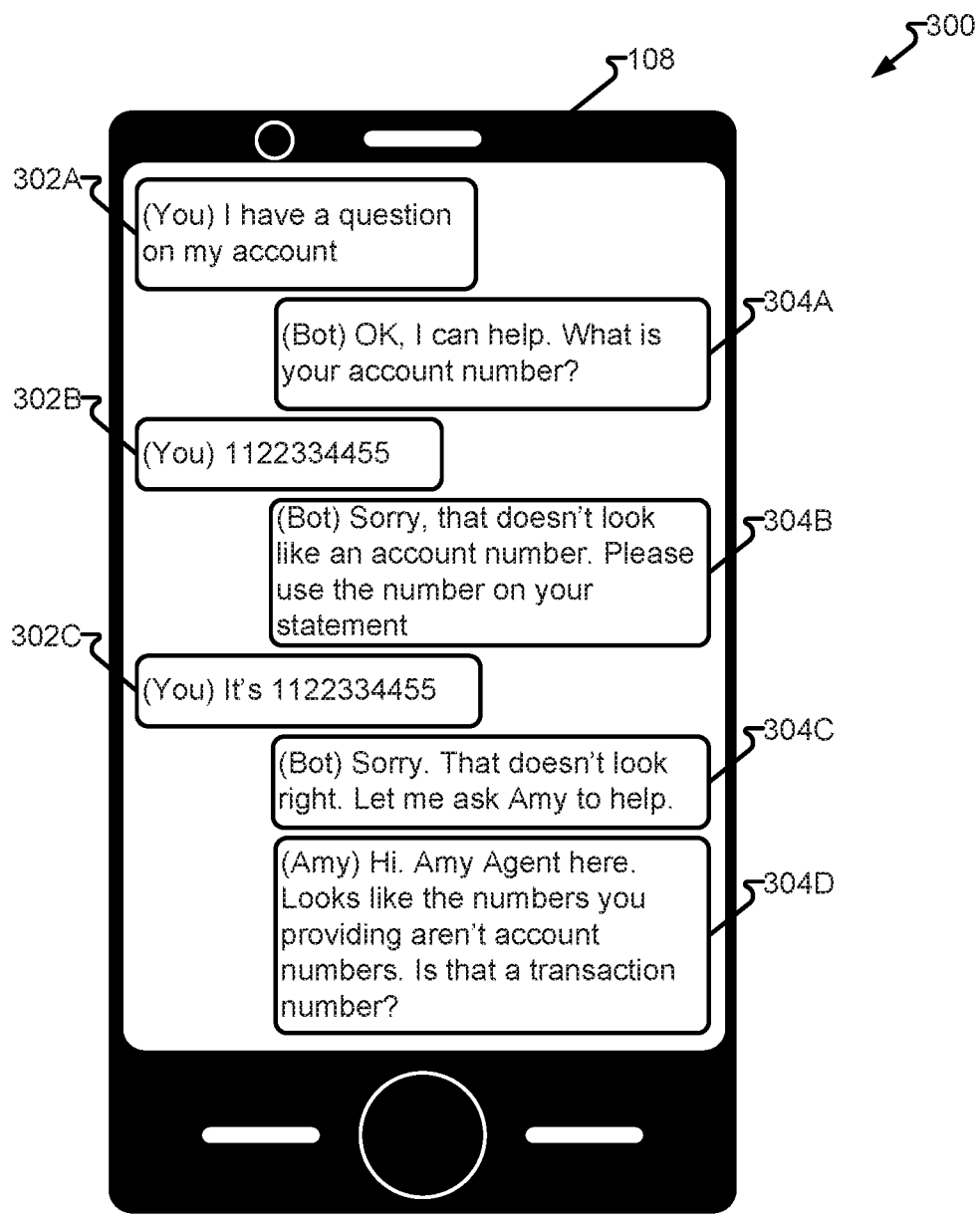
FIG. 3 depicts a first interaction displayed on a customer communication device accordance with embodiments of the present disclosure.

FIG. 3 depicts interaction 300 displayed on customer communication device, such as customer communication device 108, in accordance with embodiments of the present disclosure. In one embodiment, customer 208 (not shown) utilizes customer communication device 108 to interact with server 202 (not shown) and the automated agent. Customer 208 provides messages 302A, 302B, and 302C and the automated agent provides messages 304A, 304B, 304C, and 304D. The interaction comprising messages 302 and 304 show a failure to receive required and/or expected information (e.g., an account number).

The automated agent may determine that progress has stalled and the required information is necessary to proceed but absent and the efforts of the automated agent to obtain the required information have been exhausted. Server 202 may select a number of options including, but not limited to, create a micro-task for human agent 206, or abandon the communication. While abandonment may be more appropriate if the responses received are illogical, gibberish, or otherwise indicative of a customer who has no desire to provide information necessary for any work item, however, often certainty is lacking as to whether customer 208 is being uncooperative or a misunderstanding is occurring (e.g., misreading an account number, utilizing a different language, etc.). A micro-task may be more appropriate for situations such as resolving a failed attempt to parse an input from customer 208.

In one embodiment, the automated agent provides message 304C to announce the involvement of a human agent. In other embodiments, customer 208 may not be provided with any indication of a human agent and be unaware the communication involved more than one entity of contact center 108. Here, human agent 206 provides message 304D, in response to being presented with one or more messages 302A-302C and/or 304A-304C on agent communication device 204. Having the prior messages, human agent 206 may then provide message 304D or other message to resolve the issue. For example, customer 208 may be asked for an account number but provide a transaction number, such a difference in input form may be readily noticed by human agent 206 and, once the correct information is available to server 202 and the automated agent, human agent 206 may be dropped from the communication.

Figure 4:
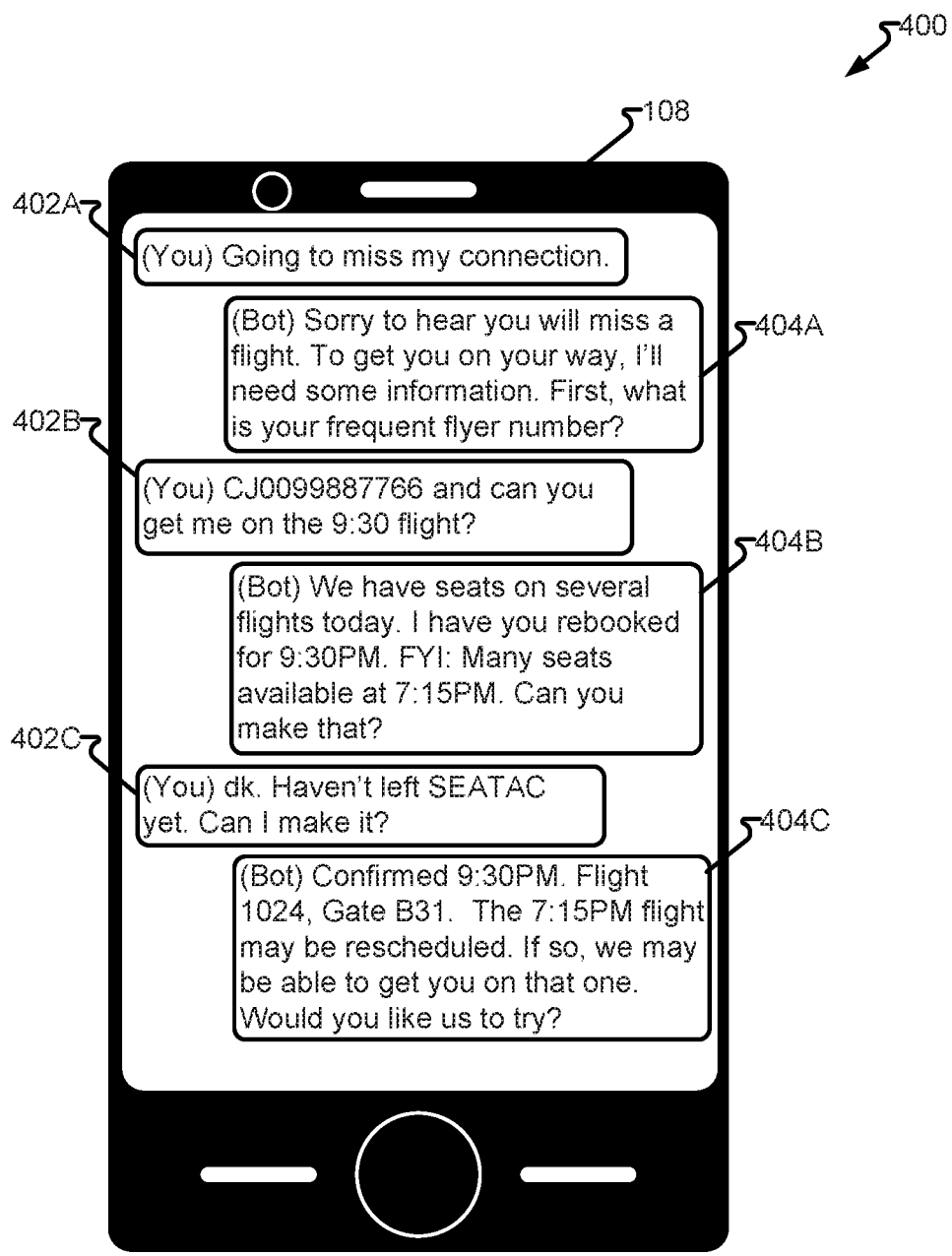
FIG. 4 depicts a second interaction displayed on a customer communication device accordance with embodiments of the present disclosure.

FIG. 4 depicts interaction 400 displayed on a customer communication device displayed on customer communication device, such as customer communication device 108, in accordance with embodiments of the present disclosure. In one embodiment, customer 208 provides messages 402A, 402B, and 402C and server 202 executing the automated agent provides messages 404A, 404B, and 404C. While the communication initially progresses progress to completing the work item (e.g., rebooking a flight) stops. In one embodiment, single message 402C, fails to answer the question asked in message 404B. In other embodiments, a plurality of messages may be query customer 208 before concluding that progress has slowed or stopped. Without presenting cues to customer 208, the automated agent may present a micro-task to human agent 206 which responds to the automated agent. The automated agent then responds, such as with message 404C, in response to the input received from human agent 206. The automated agent responds to the input from human agent 206 and entirely or in part ignore one or more messages that indicated stalled or stopped progress (e.g., message 402C).

Figure 5:
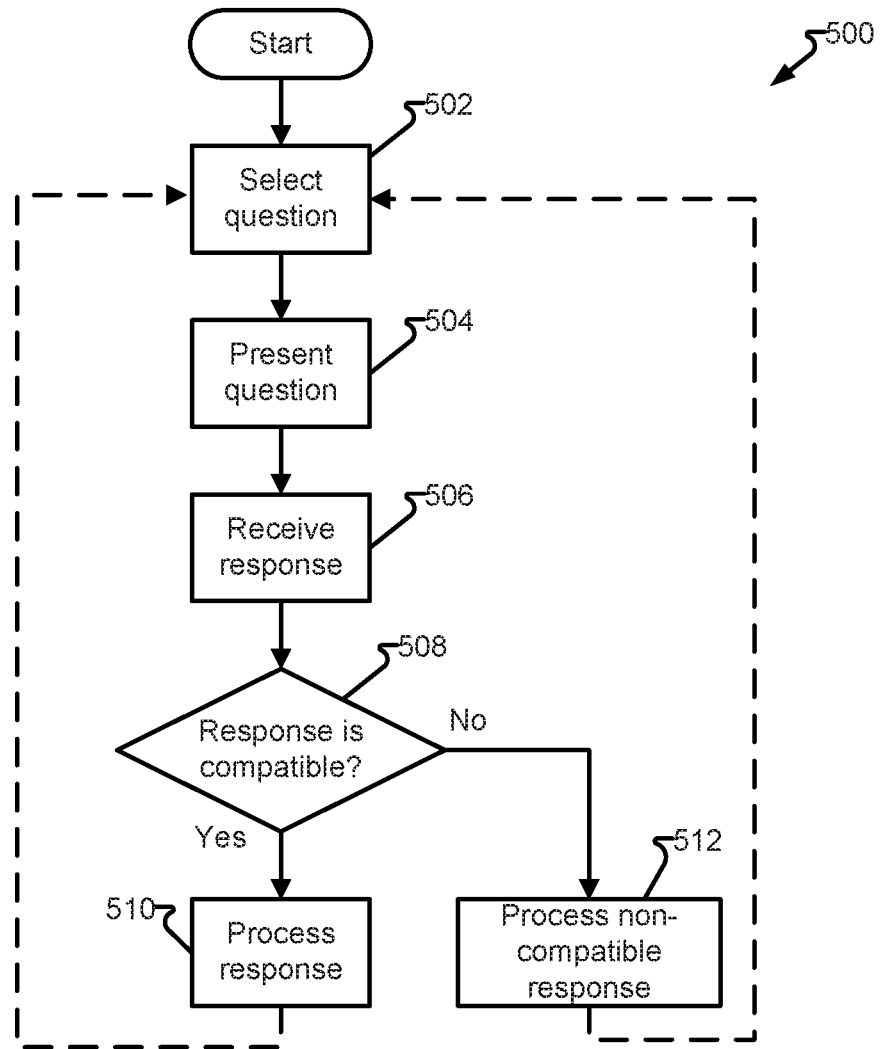
FIG. 5 depicts a first process in accordance with embodiments of the present disclosure.

FIG. 5 depicts process 500 in accordance with embodiments of the present disclosure. In one embodiment, process 500 determines if a response, or one or more of a plurality of responses, are compatible with a work item and/or a question or query presented to a customer, such as customer 208 utilizing customer communication device 108 being queried by server 202 executing an automated agent. Step 502 selects a question, and/or rules for question generation, to ask customer 208, such as may be accessed, in whole or in part, from database 210, customer data base 118, and or other data repository.

The automated agent then presents the question in step 504 and receives a response step 506. Step 508 determines if the response received in step 506 is compatible. Compatibility may be determined as to whether the response directly answers the question presented in step 504 or addresses a similar item, such as by providing more information or information that would have been the subject of a future question selected in step 502 and asked in a future presentation of step 504. For example, a first question presented in step 504 may be, "What is your account number?" The response may comprise both the account number and additional information (e.g., "1234567 and my name is Karen Customer."), such as when a future question would ask for a name.

In one embodiment, step 508 determines that the response is not compatible and, in response, executes step 512. Step 512 may be the presentation of a micro-task to a human, such as human agent 206 to address the non-compatible response. Should the response be determined to indicate unresponsiveness, step 512 may caution provide a warning that the communication may be terminated if future responses are non-compatible, or disconnect the communication. However, in another embodiment, should the response be determined as not compatible in step 508 for reasons due to limitations of the automated agent, the work item may be entirely transferred to a human agent. Should process 500 be able to continue with the automated agent, process 500 may resume at step 502 and continue until the work item is completed or otherwise concluded with the automated agent.

In another embodiment, upon step 508 being determined in the affirmative, step 510 is executed and the response received in step 506 is processed. This may lead to a continuation of process 500 back to step 502 until the work item is completed or concluded.

Figure 6:
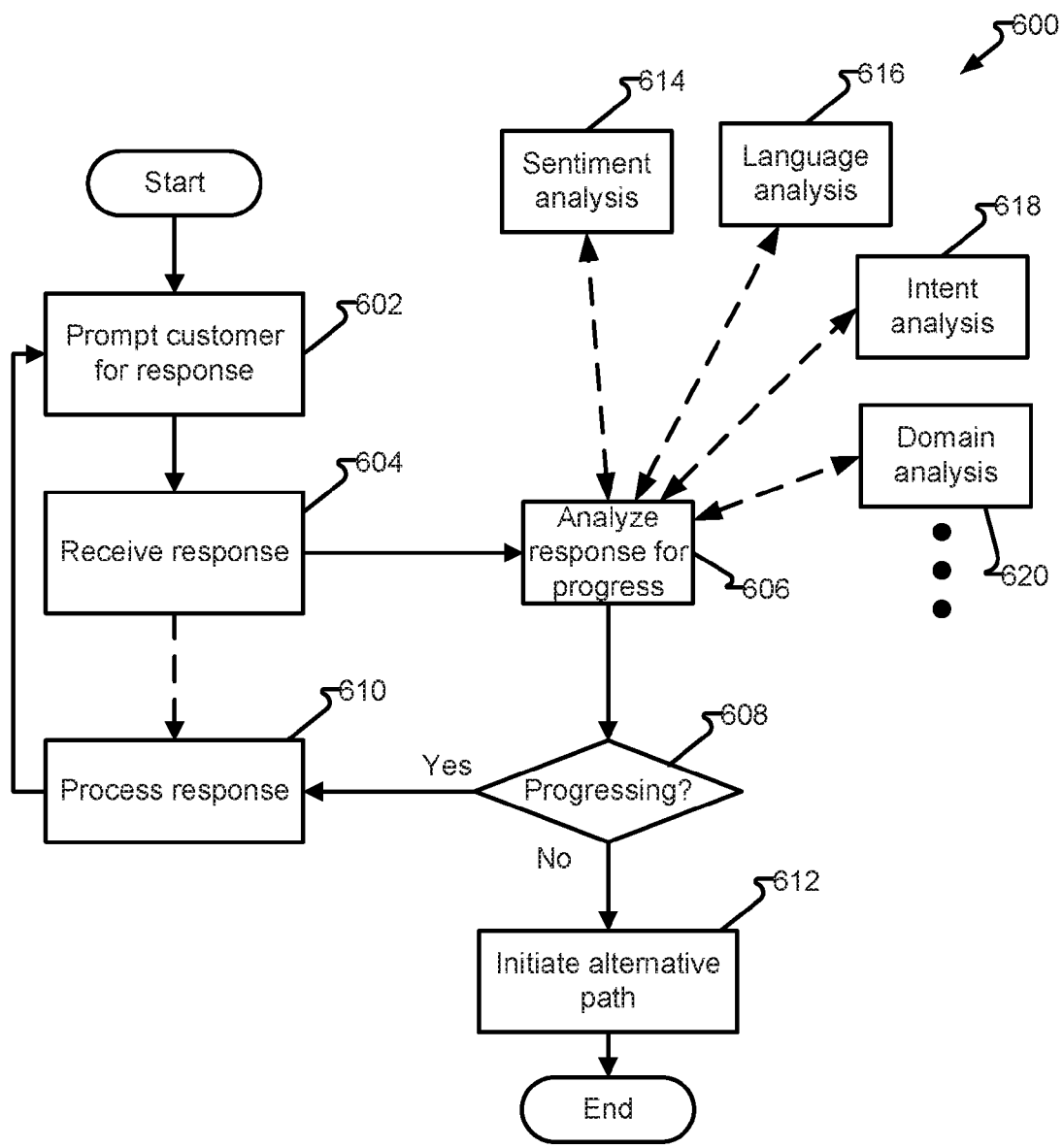
FIG. 6 depicts a second process in accordance with embodiments of the present disclosure.

FIG. 6 depicts process 600 in accordance with embodiments of the present disclosure. In one embodiment, process 600 begins at step 602 wherein a customer is prompted to provide a response. The response is received at step 604 and process 600 may then comprise a number of parallel or sequential processes. In one process, step 610 provides the for the processing of the response received in step 604, which then may loop back to step 602 until the work item has concluded.

In another embodiment, the response received at step 604 is then followed by step 606 analyzing the response for progress. Step 606 may comprise a number of subprocesses including, but not limited to, sentiment analysis 614, language analysis 616, intent analysis 618, and/or domain analysis 620. Sentiment analysis performed in step 614 may comprise determining a sentiment (e.g., positive, neutral, negative, etc.) and/or a change in progress, such as over several responses received upon several iterations comprising step 604. In a further embodiment, should the sentiment be negative step 606 may determine progress is failing or at least suspect. Optionally, the sentiment analysis performed in step 614 may comprise a subject matter analysis, such as separately or in conjunction with domain analysis performed in step 620. For example, step 614 may determine a negative sentiment, but if the domain analysis performed at step 620 determines the domain is negative (e.g., foreclosure, overdrawn funds, expected item not arriving, dissatisfaction with goods or services, etc.) then sentiment analysis 614 may be weighted to discount the impact of the negative sentiment or omit step 614 entire.

In another embodiment, the language analysis performed in step 616 may comprise a determination of native, preferred, and/or available language. For example, step 606 may incorporate step 616 and determine that progress is stalled or stalling and language utilized may not be the best language for the particular customer. Accordingly, step 606 may further determine that progress is lacking due to a failure to utilize a more productive language for the customer. Accordingly, the communication may change, or ask the customer to change, to a language that is selected to improve progress.

In another embodiment, the intent analysis performed in step 618 may comprise a determination of an intent and may further comprise a determination of an appropriateness of an intent for the communication. For example, text-based communication may be determined to be less well suited for particular items (e.g., secure information exchange, high-value purchases, etc.) Accordingly, step 606 may utilize intent to determine progress is lacking due to step 618 determining an intent that either cannot be performed or has been determined to better suited for another communication channel. The communication may then be moved to a more appropriate channel in step 612.

In yet another embodiment, the domain analysis performed in step 620 may comprise a determination of whether a response received in at least one step 604 is within a domain associated with a work item, or even a prospective work item, of contact center 102. A response may be outside of domain due to it being nonsensical or merely irrelevant to a particular domain. For example, contact center 102 may be a clothing retailer and one response received at step 604 may be related to life insurance and, accordingly irrelevant to the particular contact center 102. In another example, a response received at step 604 may be gibberish or nonsensical or otherwise identified as a non-domain response.

Next, step 608 may determine if progress is continuing and, if determined in the affirmative, processing may continue to step 610, if not already executed, where the response is processed. If step 608 is determined in the negative, step 612 initiates an alternative path. In one embodiment, step 612 may select a different agent, such as human agent 602. In another embodiment, the alternative path may be a different channel as compared to the current channel. The different channel may be a different text-based channel, such as moving from SMS to email, email to SMS, email to chat, etc. In another embodiment, the channel may comprise a different communications medium, such as voice, video, etc. In yet another embodiment, the lack of a timely response may be processed as a response and further determined to be an indication of lack of progress.

Figure 7:
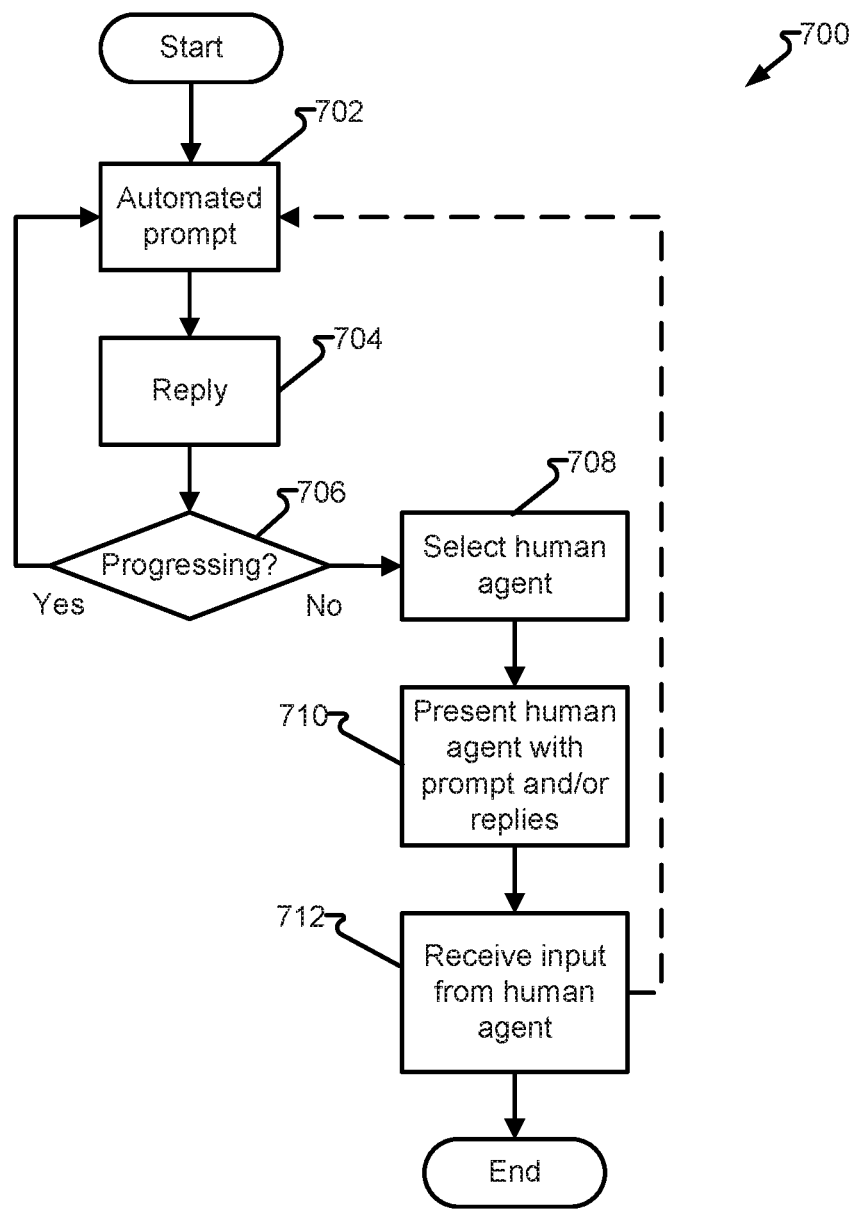
FIG. 7 depicts a third process in accordance with embodiments of the present disclosure.

FIG. 7 depicts process 700 in accordance with embodiments of the present disclosure. In one embodiment, step 702 provides an automated prompt, such as a query (e.g., "What is your account number?") or request for action (e.g., "Press and hold the reset button.") provided by an automated agent executed by server 202 and a reply is received in step 702, such as from customer 208. Step 706 determines if the interaction is progressing, which may comprise determining if required information is being provided, if questions are being repeated, if errors are being made, or other indication of whether a work item associated with the communication is advancing with a reasonable expectation of timely completion. If step 706 is determined in the positive, process 700 may continue back to step 702 such as to prompt the customer with another question or action. Process 700 may execute steps 702, 704, 706 multiple times until the contact center has the information necessary or the customer has performed necessary actions to complete the work item.

In another embodiment, step 706 is determined in the negative. A determination, at step 706, that progress is not being made may be the result of customer 208 wishing to opt-out of the automated and/or text-based interaction or for the need for contact center 102 to create a micro-task for human agent 206 to perform that, once performed, would allow the automated/text-based interaction to continue. Step 708 selects a human agent, such as one allocated to micro-tasks, if the lack of progress is determined to hinge on a single or limited set of replies received in one or more iterations of steps 704. If the lack of progress is due to the automated interaction itself, a human agent may be selected having skills associated with a work item associated with any information already obtained or, if no information or no usable information has been obtained, an agent having skills associated with a presently unknown work item may be selected. Next, step 710 presents one or more prompts, presented in step 702, and/or one or more replies, received in step 704, to the human agent. Step 710 may optionally initiate an announcement to the customer and/or request any information that may be beneficial to the human agent (e.g., "Autoagent here. I'm going to transfer you to a live agent. So the agent has it available, please provide your account number now.").

The human agent then responds in step 712. If the task is a micro-task, process 700 may process the reply from the human agent and return to step 702. However, if the human agent has been allocated the communication, process 712 may terminate and the human agent continues the communication with the customer. In another embodiment, step 712 may comprise a signal, such as to server 202, indicating the customer is being uncooperative and process 700 may disconnect the communication or optionally caution the customer that future cooperation is required or the communication will be terminated.

Figure 8:
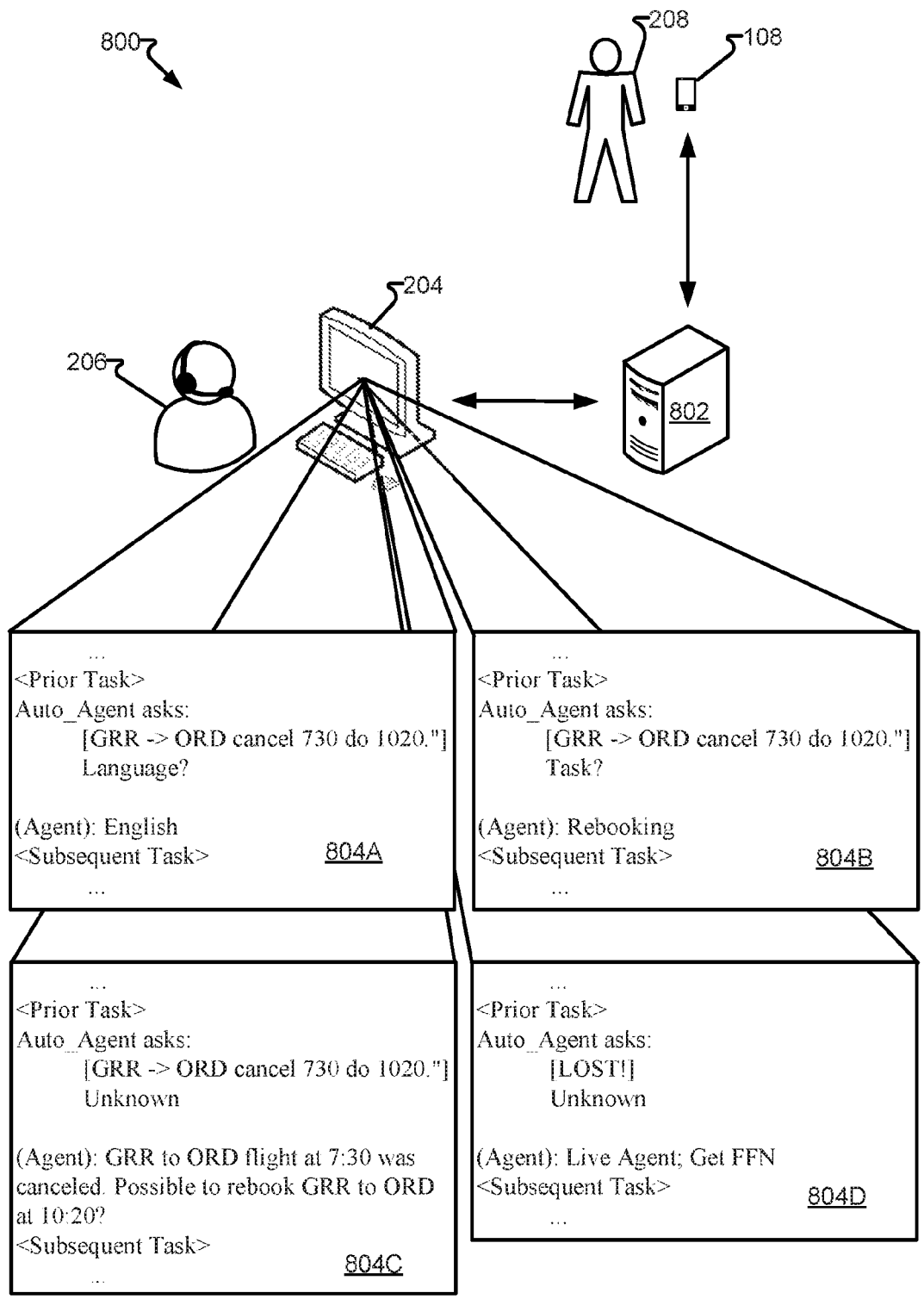
FIG. 8 depicts a third system in accordance with embodiments of the present disclosure.

FIG. 8 depicts system 800 in accordance with embodiments of the present disclosure. In one embodiment, customer 208 utilizes customer communication device 108 to interacting with server 802 executing an automated agent and in communication with human agent 206 via agent communication device 204. Server 802 cause messages, such as those of screen portions 804A, 804B, 804C, and 804D to be presented on agent communication device 204 for action by human agent 206.

In one embodiment, screen portion 804A illustrates a work queue for human agent 206 comprising a message from the automated agent to provide a context (e.g., a determination of which language to use). A message received from customer 208 is presented along with a question for human agent 206 (e.g., "Language?"). Human agent 206 then provides a response (e.g., "English") and returns to other work items. The automated agent then processes the message and replies with the benefit of knowing that language to utilize.

In another embodiment, screen portion 804B illustrates a work queue for human agent 206 comprising a message from the automated agent to provide an identification of a work item or task associated with a reply or message from customer 208. Human agent 206 may be presented with one or more messages from customer 208 and a question to identify the work item category (e.g., Rebooking a passenger who was on a canceled flight.). Human agent 206 provides the information and returns to other tasks or work items.

In another embodiment, screen portions 804C and 804D each illustrate a work queue for human agent 206 comprising a message from the automated agent indicating that no known information was identified in a reply from customer 208. Human agent 206 may be presented with one or more messages from customer 208 and prompted to identify the work item. As illustrated in screen portion 804C, human agent 206 may rephrase or otherwise provide a verbose description of the task or request received from customer 208 and, after which, resume work on other tasks or work items. As illustrated in screen portion 804D, human agent 206 may provide a signal to the automated agent that the work item, or an attribute (e.g., urgency) of the work item, may require escalation, such as to a human agent. Accordingly, the automated agent may respond to customer 208 indicating that a human agent, which may be the same or different human agent as human agent 206, will be joining the communication. After which, human agent 206, if assisting customer 208 may perform a subsequent task of communicating with customer 208 or resuming other work items.

Figure 9:
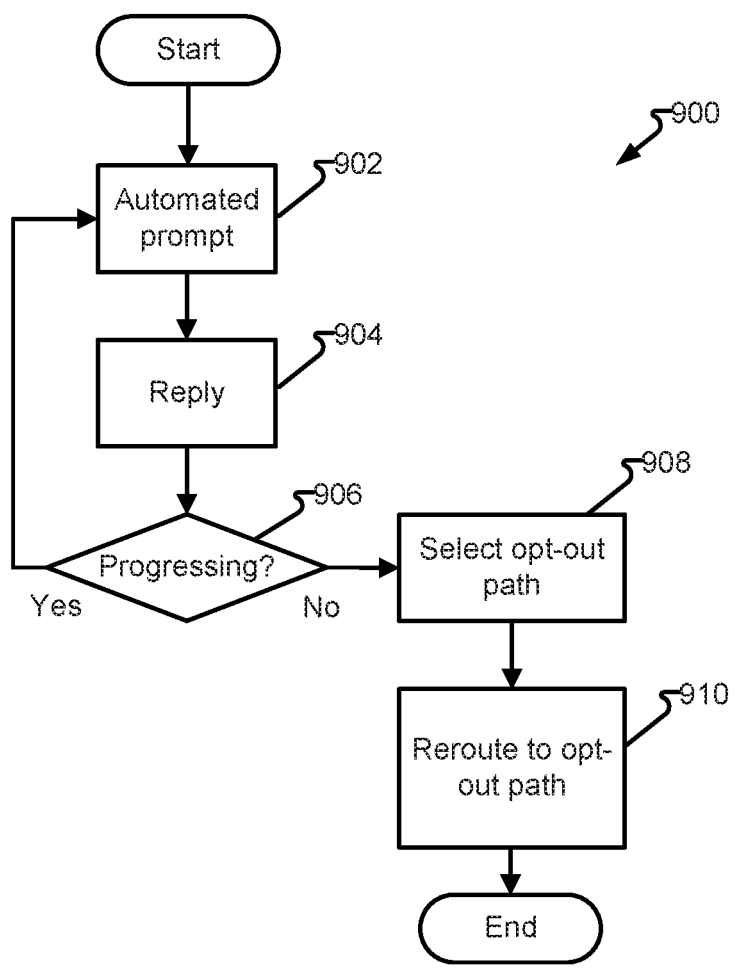
FIG. 9 depicts a fourth process in accordance with embodiments of the present disclosure.

FIG. 9 depicts process 900 in accordance with embodiments of the present disclosure. In one embodiment, process 900 determines whether a customer, such as customer 208 is wanting to opt-out of the automated text-based communication. Step 902 provides an automated prompt, such as to solicit a response or an action from customer 208. Customer 208 may explicitly respond or reply in step 904 or implicitly reply. For example, step 902 may request customer 208 perform a reset operation on a device and step 904 may be a signal from the device indicating or associated with being reset. Step 906 determines if progress is being made and, if determined in the affirmative, process 900 may loop back to step 902 until terminated, such as by the completion of a work item.

In another embodiment, step 906 is determined in the negative and, following which, step 908 is executed wherein an opt-out path is selected. Step 908 may select an opt-out path comprising one or more of a different agent or a different communication channel. A different agent, such as human agent 206, may be selected if the interaction with the automated agent appears to be the source of the lack of progress. For example, restating the same question multiple times, asking for clarification, stating that something was not understood, asking questions which the automated agent is unable to answer, etc. may result in selecting an opt-out path to human agent 206. If the text-based communication appears to be the source of lack of progress (e.g., typing errors, autocorrect errors, etc.), the communication may opt-out to a different channel (e.g., voice, etc.). In another embodiment, the reply in step 904 may be an explicit request to opt-out and, cause step 906 to be determined in the negative. Accordingly, step 908 may select an opt-out path associated with the reply received in step 904 (e.g., "I want a real person." "Have someone call me." etc.). Step 910 then performs the opt-out operation and reroutes the communication to the opt-out path.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (e.g., GPU, CPU), or logic circuits programmed with the instructions to perform the methods (e.g., FPGA).

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a network connection;
a processor to:
    access a communication between a customer of a contact center and an automated agent of the contact center and wherein the communication is associated with a work item of the contact center, and wherein the communication comprises a plurality of messages utilizing a text communication channel;
    provide, as a component of the communication, at least one of the plurality of messages as a query message selected to obtain an expected response message from the customer that addresses at least a portion of the work item;
    determine that progress is not being made upon determining that at least one of the plurality of messages is a received response message comprising an out of context message;
    upon determining that the communication is not progressing towards resolution of the work item, initiating an alternative communication comprising at least one of an alternative agent or an alternative communication channel; and
    wherein the at least one of the plurality of messages comprises a query to solicit an expected response message from the customer to answer the query and the processor determines that progress is not being made based upon the received response message failing to provide an answer to the query.

2. The system of claim 1, wherein the processor further executes a process comprising the automated agent.

3. The system of claim 1, wherein, the query comprises a request to identify an action associated with the work item and, the communication is determined to not be progressing upon the response message failing to identify the action associated with the work item.

4. The system of claim 1, wherein the response message from the customer comprises a free-form response.

5. The system of claim 1, wherein the processor determines that progress is being made upon determining the out of context messages comprises redirecting the communication to a different work item.

6. The system of claim 1, wherein the processor determines that progress is being made upon further determining the out of context messages comprises a response to a currently unasked query associated with the work item.

7. The system of claim 1, wherein, determining the communication is not progressing, further comprises the processor performing one or more of (a) a sentiment of the communication, (b) a language analysis, (c) an intent analysis, or (d) a domain analysis.

8. The system of claim 1, wherein, upon determining the communication is not progressing, the processor performs one or more of (a) moving the communication to an alternative channel comprising a live agent, (b) logging the customer as an uncooperative person, (c) providing a warning dialog cautioning the customer to resume progress of resolution of the work item, or (d) providing a justification for why the information requested by the query is needed.

9. A system, comprising:
a network connection;
a processor to:
    access a first communication between a customer of a contact center and an automated agent of the contact center and wherein the first communication is associated with a work item of the contact center, and wherein the first communication comprises a plurality of messages utilizing a text communication channel;

receiving a response message, of the plurality of messages, from the customer;

in response to determining that the response message comprises a nonsensical response, initiating a branch communication comprising presenting at least one of the plurality of messages to a human agent, receiving a response from the human agent, and processing the response from the human agent as the response message from the customer;

receiving a subsequent response message, of the plurality of messages, from the customer; and in response to determining that the subsequent response message comprises a subsequent nonsensical response, initiating a subsequent branch communication comprising presenting at least one of the plurality of messages to a subsequent human agent, receiving a subsequent response from the human agent, and processing the subsequent response from the human agent as the subsequent response message from the customer.

10. The system of claim 9, wherein the response from the human agent provides a processing cue to the automated agent and is absent any response to the customer.

11. The system of claim 9, wherein, upon receiving the response from the human agent, the processor terminates the branch communication.

12. The system of claim 9, wherein, upon receiving a signal from the human agent, the processor terminates the first communication.

13. The system of claim 9, wherein the response message is a first message of the plurality of messages.

14. The system of claim 9, wherein the response from the human agent comprises a language identification.

15. The system of claim 9, wherein the processor processes the combination of the response from the human agent and the response message as the response message.

16. The system of claim 9, wherein the human agent comprises an agent allocated to providing the response from the human agent and, upon providing the response from the human agent, is allocated to another work item.

17. The system of claim 9, wherein the human agent and the subsequent human agent are the same person.

18. A system, comprising:

a network connection;

a processor to:

access a first communication between a customer of a contact center and an automated agent of the contact center and wherein the first communication is associated with a work item of the contact center, and wherein the automated communication comprises a plurality of messages utilizing a text communication channel;

providing, as a component of the plurality of messages, a query message selected to obtain an expected response message from a customer that addresses at least a portion of the work item;

receiving a response message, in response to the query message, from the customer;

in response to determining that the received response message comprises an intent to opt-out of the first communication and initiate a subsequent interaction, selecting an opt-out mode, transferring the work item to a second communication between the customer and a second agent, and terminating the first communication;

receiving a subsequent response message, of the plurality of messages, from the customer; and in response to determining that the subsequent response message comprises a subsequent nonsensical response, initiating a subsequent branch communication comprising presenting at least one of the plurality of messages to a human agent, receiving a subsequent response from the human agent, and processing the subsequent response from the human agent as the subsequent response message from the customer.

* * * * *

UNITED STATES PATENT AND TRADEMARK OFFICE
CERTIFICATE OF CORRECTION

PATENT NO. : 10,003,692 B2
APPLICATION NO. : 15/298914
DATED : June 19, 2018
INVENTOR(S) : David Skiba et al.

Page 1 of 1

It is certified that error appears in the above-identified patent and that said Letters Patent is hereby corrected as shown below:

In the Claims

At Column 23, Line 7, Claim 9 after "from the customer;" insert --and-- therein.

At Column 23, Line 24, Claim 9 please delete "message" and insert --messages-- therein.

Signed and Sealed this
Fourth Day of September, 2018

Andrei Iancu
*Director of the United States Patent and Trademark Office*